United States Patent [19]
Zelenka

[11] 3,800,904
[45] Apr. 2, 1974

[54] METHOD AND APPARATUS FOR LIMITING THE VELOCITY OF A VEHICLE, ESPECIALLY OF MOTOR VEHICLES, TO A DESIRED VELOCITY

[75] Inventor: Hermann Zelenka, Bernhausen, Germany

[73] Assignee: Daimler-Benz Aktiengesellschaft, Stuttgart, Germany

[22] Filed: Aug. 7, 1972

[21] Appl. No.: 278,388

[30] Foreign Application Priority Data
Aug. 6, 1971  Germany............................ 2139411

[52] U.S. Cl.......................... 180/105 E, 303/21 CE
[51] Int. Cl............................................. B60k 27/00
[58] Field of Search............. 180/105 E, 105 R, 82; 303/21 CE, 21 CH

[56] References Cited
UNITED STATES PATENTS
3,647,016  3/1972  Fitzsimons et al............. 180/105 R Primary Examiner—Allen N. Knowles
Assistant Examiner—Gene A. Church
Attorney, Agent, or Firm—Craig and Antonelli

[57] ABSTRACT

A method and apparatus for limiting the velocity of vehicles, especially of motor vehicles to a desired velocity, in which a frequency proportional to the vehicle velocity is produced by a frequency generator coordinated to one wheel, which is converted by a frequency-voltage converter into a D.C. voltage that acts on a switching circuit in such a manner that upon exceeding a voltage proportional to the selected, desired velocity, a switching signal is triggered which, in its turn, acts on the fuel supply, the brake system, and/or other units in a velocity-reducing sense.

23 Claims, 1 Drawing Figure

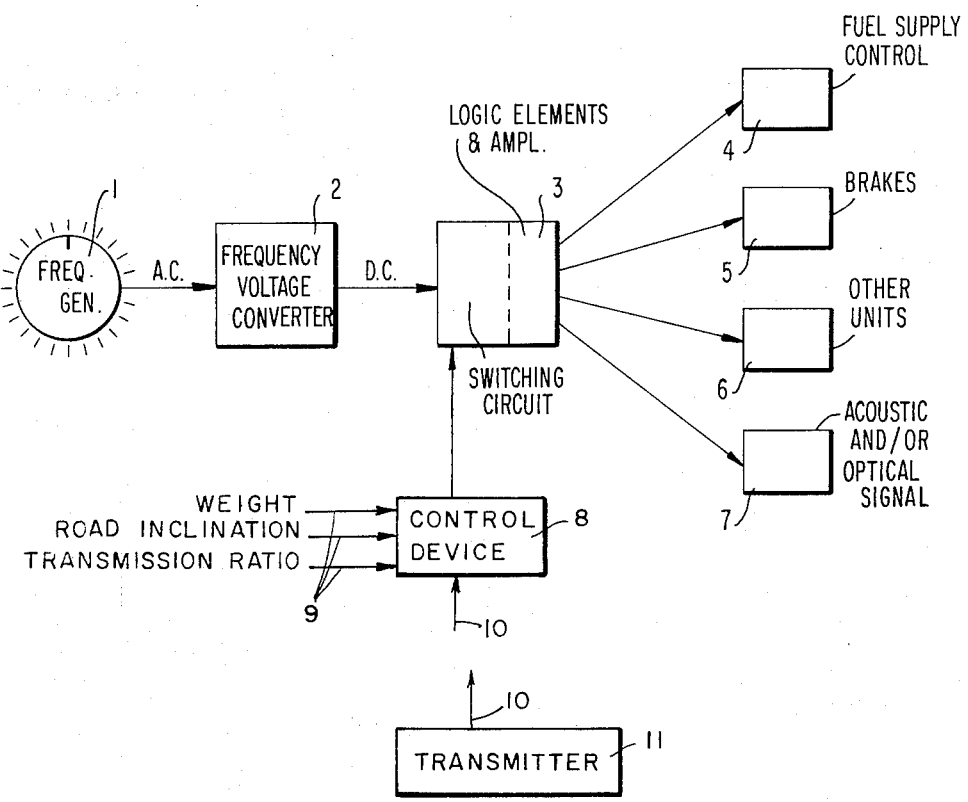

METHOD AND APPARATUS FOR LIMITING THE VELOCITY OF A VEHICLE, ESPECIALLY OF MOTOR VEHICLES, TO A DESIRED VELOCITY

The present invention relates to a method for limiting the velocity of vehicles, especially of motor vehicles, to a desired or intended velocity. The present invention also relates to an apparatus for carrying out this method.

A large number of methods and apparatus for limiting the velocity of vehicles are known in the prior art.

Mechanical devices entail the disadvantage that they include many movable parts, requiring service and prone to repair, are relatively bulky and require high manufacturing costs. They are thus eliminated beforehand in comparison with electrical or electronic devices.

Electrical mechanisms are known which derive the velocity of the vehicle from the high voltage of the secondary winding of the ignition coil and cause the ignition to become inoperable above a desired or rated value. This, however, is too inaccurate and additionally entails the disadvantage that the harmful components of the exhaust gases are considerably increased.

Electronic devices which have become known heretofore are very complicated and thus very expensive. They also entail, for the most part, the disadvantage to include timing elements for a desired value comparison which again leads to inaccuracies or again to expensive installations. In contradistinction thereto, the present invention is concerned with the task to find a simple method in order to be able to get along in the realization thereof with few parts and thus small volumes, to avoid timing or storage elements, to utilize components already possibly present in the vehicle and thus to reach extraordinarily low manufacturing costs.

The underlying problems are solved by a method which provides according to the present invention that a frequency proportional to the vehicle velocity is produced and is converted into a D.C. voltage proportional thereto, which acts on a switching or shifting device and upon exceeding a voltage proportional to the selected desired velocity, triggers within the switching or shifting device a switching or shifting signal which in its turn acts in a velocity-reducing sense on the fuel supply, the brake system and/or other aggregates. The velocity reduction can also take place by a change of the throttle valve position in carburetor engines or in electric vehicles, for example, by a decrease of voltage or current.

The advantage of the method according to the present invention resides in that it is generally applicable to all types of vehicles insofar as suitable supply voltages can be made available therein and that simple devices are satisfactory for its realization due to its simplicity. A particular advantage of the mtehod according to the present invention is the fact that below the selected desired or rated velocity, the driving behavior is not impaired. The selection of the individual speeds, the acceleration capability, etc., remain fully preserved.

In addition to the velocity-reducing influence, it is also possible that the switching of shifting signal produces an optical and/or acoustic signal.

In order not to exceed a vehicle maximum velocity prescribed, for example, by law, the selecting range for the desired or rated velocity has an upper limit corresponding to a predetermined and prescribed desired maximum velocity. This method is applicable according to the present invention also without selecting range exclusively for the limitation of the velocity to a desired or rated maximum velocity.

If, however, desired or rated velocities lying below this desired or rated maximum velocity are to be adjustable, for example, 30km/h at construction places, 50 km/h in local traffic, etc., the voltage threshold corresponding to the selected rated or desired velocity is adjustable in steps within the selecting range.

However, the present invention prefers a continuous adjustability of the voltage threshold corresponding to the selected rated or desired velocity insofar as the same is carrid out manually or by a control device present within the vehicle.

The apparatus according to the present invention for the realization of this method is constructed in such a manner that a frequency transmitter or generator is coordinated to one of the wheels of the vehicle, in the output of which are connected a frequency-voltage converter and a switching circuit which switches upon exceeding a predetermined voltage threshold.

In vehicles which are equipped wih an anti-locking system, the installation of the present invention can be applied with particular advantage because with these systems, the frequency generator and the frequency voltage converter are already present. Particularly favorable as regards price is an application of the inventive subject matter in motor vehicles which in addition to an anti-locking system are also equipped with an electronic fuel-injection system because in this case the throttling or turning off of the fuel supply can be carried out in a particularly simple manner and this type of power output reduction does not excessively increase the harmful components in the exhaust gases. For that purpose only the switching or shifting installation with possibly necessary amplifier and matching logic elements is necessary.

The shifting or switching installation includes an electronic trigger circuit of conventional construction. The switching or shifting installation, however, can also include in accordance with the present invention other circuits, for example, an operational amplifier circuit.

The latter is constructed in such a manner that the voltage threshold corresponding to the desired maximum velocity can be reduced continuously or stepwise.

One possibility to realize the same consists according to the present invention in that the adjustment of the voltage threshold corresponding to the desired velocity can be carried out manually. This will be appropriate in particular for passenger motor vehicles. Another possibility resides in that a control device is present in the vehicle and is constructed in such a manner that the adjustment of the voltage threshold corresponding to the desired velocity can be realized by the control device of any known construction for example effecting a control as a function of various parameters by the use of appropriate conventional logic elements.

In addition to a manual adjustment this possibility is contemplated according to the present invention for commercial and rail vehicles where different influencing magnitudes such as weight, road inclination, transmission ratio, etc. are correspondingly connected with each other so that in each case only desired velocity of such magnitude can be reached that the vehicle can be brought to a halt at any time without overloading the brakes.

A further embodiment of the present invention consists in that the shifting or switching installation is so constructed that the adjustment of the voltage threshold corresponding to the desired velocity is realizable by installations disposed outside the vehicle.

This possibility of the application of the present invention is concerned in particular with an automatic velocity control primarily with rail vehicles, whereby by the transmission of, for example, inductive signals, a respective maximum velocity is pre-adjustable either by apparatus fixedly installed in the track body or transmitted by process control.

This possibility also exists with road vehicles whereby the signals to be transmitted are transmitted, for example, inductively upon driving over transmitters embedded in the road.

It is also possible by the adjustment of the voltage threshold to zero to stop the vehicle automatically in case of emergency.

An optimum solution is according to the present invention the combination of a fixedly set, desired maximum velocity which cannot be increased, together with an adjustment of a desired velocity lying therebelow to be manually actuated continuously, of a control disposed in the vehicle for the avoidance of dangerous driving conditions and of a control acting on the vehicle from the outside thereof for the legally required traffic limitation of the velocity.

Accordingly, it is an object of the present invention to provide a method and apparatus for the limitation of the velocity of vehicles to a desired velocity which avoids by simple means the aforementioned shortcomings and drawbacks encountered in the prior art.

Another object of the present invention resides in a method and apparatus for limiting the velocity of vehicles to a desired or required velocity which avoids the need for numerous movable parts requiring frequent service and repairs and which is relatively space-saving while at the same time avoiding high manufacturing costs.

A further object of the present invention resides in a method and apparatus for limiting the velocity of vehicles, especially of motor vehicles to a desired or rated velocity which does not considerably increase the harmful components in the exhaust gases of the internal combustion engine driving the vehicle.

Still another object of the present invention resides in a method and apparatus for limiting the velocity of vehicles to a desired velocity which is highly accurate and operationally reliable, utilizes relatively few and simple parts and involves relatively low manufacturing costs without impairing the normal driving behavior of the vehicle below the selected desired maximum velocity.

These and further objects, features and advantages of the present invention will become more apparent from the following description when taken in connection with the accompanying drawing which shows, for purposes of illustration only, one embodiment in accordance with the present invention, and wherein:

The single FIGURE is a schematic block diagram of an installation for limiting the velocity to a desired velocity in accordance with the present invention.

Referring now to the single FIGURE of the drawing, a frequency transmitter or generator 1 coordinated to a wheel of the vehicle and of conventional construction produces an A.C. voltage or a pulsating D.C. voltage with a frequency proportional to the vehicle velocity. This voltage is fed to the frequency-voltage converter 2 of conventional construction which supplies a D.C. voltage proportional to the frequency or velocity. This D.C. voltage, which is present in the output of the frequency-voltage converter 2, is fed to a switching device 3 which compares the D.C. input voltage thereof with a pre-adjusted voltage threshold and which becomes operable upon exceeding the same, i.e., produces a switching signal when the D.C. voltage from the frequency-voltage converter 2 exceeds the predetermined voltage threshold value. This switching signal produced in the switching or shifting device 3 is utilized to act by conventional means on the fuel supply 4, the brakes 5 and/or other aggregates 6 in a velocity-reducing manner and possibly triggers off an optical and/or acoustical signal 7 by conventional means. The adjustment of the voltage threshold of the switching device 3 which is to be carried out manually or automatically is indicated schematically by control means 8 and can be realized by conventional means, known as such in the art. The matching logic and amplification elements necessary for the given application purpose are to be considered accommodated in the switching device 3 and are schematically indicated by the dash line. Since the various elements indicated by the blocks are of known construction, utilizing conventional circuits of commercially available elements, a detailed description thereof is dispensed with herein.

Similarly, the control means provided within the vehicle to correlate the variable magnitudes, represented by arrows 9 such as weight, road inclination, transmission ratio, etc. to obtain a corresponding, predetermined value for the desired velocity utilize conventional elements, including commercially available logic elements, interconnected as known in the art, and, therefore, not described herein in detail. The same is also true with respect to those control means 8 that effect an operation of the shifting or switching installation by means external of the vehicle, such as by inductive signals represented by arrow 10 transmitted by conventional transmitter means 11 embedded in the road or fixed to the track of the vehicle.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. An apparatus for limiting the velocity of vehicles, to a desired velocity, characterized in that a frequency transmitter means is coordinated to a wheel of the vehicle which produces a voltage having a frequency proportional to the vehicle velocity, a frequency-voltage converter means operatively connected to the frequency-transmitter means for converting the frequency into a D.C. voltage, switching means connected in the output of the frequency-voltage converter means which becomes operable to cause a reduction in the vehicle velocity upon exceeding a predetermined voltage threshold, and in that a control means is present in the vehicle which is operable in such a manner that the adjustment of the voltage threshold corresponding to the desired velocity can be realized by said control means.

2. An apparatus according to claim 1, characterized in that the switching means produces a switching signal which acts on at least one of fuel supply means, brake means and other aggregates in a velocity-reducing manner.

3. An apparatus according to claim 2, characterized in that the switching circuit means produces a switching signal producing at least one of optical and acoustic signal.

4. An apparatus according to claim 1, characterized in that the switching means includes an electronic trigger circuit means.

5. An apparatus according to claim 4, characterized in that the electronic trigger circuit means is constructed in such a manner that the voltage threshold corresponding to the desired maximum velocity can be reduced.

6. An apparatus according to claim 5, characterized in that the voltage threshold corresponding to the desired maximum velocity can be reduced continuously.

7. An apparatus according to claim 5, characterized in that the voltage threshold corresponding to the desired maximum velocity can be reduced stepwise.

8. An apparatus according to claim 5, characterized by means for manually adjusting the threshold voltage corresponding to the desired velocity.

9. An apparatus according to claim 8, characterized in that the switching means includes means for enabling the adjustment of the voltage threshold corresponding to the desired velocity by means disposed outside the vehicle.

10. An apparatus according to claim 9, characterized in that a selecting range exists for the desired velocity which has an upper limit corresponding to the prescribed desired maximum velocity.

11. An apparatus according to claim 1, characterized by means for manually adjusting the threshold voltage corresponding to the desired velocity.

12. An apparatus according to claim 1, characterized in that the control means includes means for enabling the adjustment of the voltage threshold corresponding to the desired velocity by means disposed outside the vehicle.

13. An apparatus according to claim 1, characterized in that a selecting range exists for the desired velocity which has an upper limit corresponding to the prescribed desired maximum velocity.

14. An apparatus according to claim 1, characterized in that the control means includes means responsive to variable vehicle control conditions for automatically adjusting the threshold value of the switching means in accordance therewith.

15. An apparatus according to claim 14, characterized in that the variable vehicle control magnitudes include at least one of weight of the vehicle, road inclination on which the vehicle is travelling and the transmission ratio of the vehicle.

16. An apparatus for limiting the velocity of vehicles, to a desired velocity, characterized in that a frequency transmitter means is coordinated to a wheel of the vehicle which produces a voltage having a frequency proportional to the vehicle velocity, a frequency-voltage converter means for converting the frequency into a D.C. voltage, switching means connected in the output of the frequency-voltage converter means which becomes operable to cause a reduction in the vehicle velocity upon exceeding a predetermined voltage threshold, and control means providing an output signal to the switching means for automatically adjusting the predetermined voltage threshold of the switching means.

17. An apparatus according to claim 16, characterized in that the control means is responsive to variable vehicle control magnitudes for providing the output signal for adjusting the predetermined threshold value of the switching means.

18. An apparatus according to claim 17, characterized in that the variable vehicle control magnitudes include at least one of weight of the vehicle, road inclination on which the vehicle is travelling and transmission ratio of the vehicle, the control means providing an output signal for adjusting the predetermined threshold of the switching means in accordance therewith.

19. An apparatus according to claim 16, characterized in that the control means includes means responsive to means disposed outside of the vehicle for providing an output signal for controlling the adjustment of the predetermined voltage threshold of the switching means.

20. An apparatus according to claim 18, characterized in that the control means also include means responsive to means disposed outside the vehicle for providing an output signal for controlling the adjustment of the predetermined voltage threshold of the switching means.

21. An apparatus according to claim 20, characterized in that the means disposed outside the vehicle include inductive transmitter means.

22. An apparatus according to claim 16, characterized in that the switching means includes means responsive to means disposed outside the vehicle for enabling the adjustment of the predetermined voltage threshold of the switching means.

23. An apparatus according to claim 22, characterized in that the means disposed outside the vehicle include inductive transmitter means for transmitting a signal to the adjustment enabling means of the switching means.

* * * * *